United States Patent [19]
Oswalt et al.

[11] Patent Number: 5,960,857
[45] Date of Patent: Oct. 5, 1999

[54] SYSTEM TEMPERATURE CONTROL TANK WITH INTEGRAL MODULATOR VALVE AND FLOWMETER

[75] Inventors: Philip D. Oswalt, Indianapolis; Steven E. Wash, Greenwood; Ronald A. Wolfe, Indianapolis, all of Ind.

[73] Assignee: Advantage Engineering, Inc., Greenwood, Ind.

[21] Appl. No.: 08/599,095

[22] Filed: Feb. 7, 1996

[51] Int. Cl.⁶ .............................. F25B 29/00; F24H 1/20
[52] U.S. Cl. ..................... 165/11.1; 165/263; 165/290; 165/293; 165/104.31; 165/120; 415/121.3; 415/178; 392/471; 392/473; 392/488; 392/489
[58] Field of Search ............................ 165/104.31, 120, 165/78, 65, 11.1, 263, 290, 293; 415/121.3, 178; 392/471, 473, 488, 489; 417/243

[56] References Cited

U.S. PATENT DOCUMENTS

| | | | |
|---|---|---|---|
| 4,928,751 | 5/1990 | Fischer, Jr. .............................. | 165/11.1 |
| 5,094,291 | 3/1992 | Oswalt et al. ...................... | 165/104.31 |
| 5,113,931 | 5/1992 | Oswalt et al. ...................... | 165/104.31 |
| 5,174,364 | 12/1992 | Mizuno .................................. | 165/11.1 |
| 5,333,676 | 8/1994 | Mizuno .................................. | 165/11.1 |
| 5,476,137 | 12/1995 | Ochiai et al. ............................ | 165/206 |

*Primary Examiner*—John K. Ford
*Attorney, Agent, or Firm*—Woodard, Emhardt, Naughton, Moriarty & McNett

[57] ABSTRACT

A machine for circulating cooling water through manufacturing process equipment includes a combination pump and heat exchanger assembly. The machine has a cast metal pump case with two upwardly opening sockets receiving the lower ends of two tanks, one of them "the suction tank" communicating through the case with the pump impeller intake, and the other "the discharge tank" communicating with the impeller discharge. The tanks are constructed to function as heat exchangers, and they are readily and removably secured to the pump case by threaded fasteners and are sealed therein by compression seals. The discharge tank has electrical heating elements. The suction tank has a motor-operated modulator valve precisely fixed thereon, so as to enable discharging excessively warm water from the process to drain while cool make-up water from city water supply is admitted through the suction tank to the pump. A controller including a microcomputer responds to temperature of water pumped from the machine through the process equipment to be temperature controlled, and returned to the machine, to control the electric heater and/or the modulator valve, as needed. A flow meter in the suction tank provides input to the controller to provide a display of the water flow through the process, and temperature sensors are used to provide input to the controller to display cooling water temperature change. This information can be combined to provide a display of the cooling load. The machine is self-contained and wheel-mounted for mobility to facilitate connection to and disconnection from the process equipment.

9 Claims, 9 Drawing Sheets

SYSTEM TEMPERATURE CONTROL TANK WITH INTEGRAL MODULATOR VALVE AND FLOWMETER

FIELD OF THE INVENTION

This invention relates generally to heat transfer systems, and more particularly to a combination pump and heat exchange componentry with flow measurement and control device which are in a compact, easily manufactured and maintained assembly.

DESCRIPTION OF THE PRIOR ART

Typical heat exchanger systems for controlling the temperature of cooling water for various kinds of manufacturing machines and processes employed tanks with heating and/or cooling coils in them and which are piped into a process water plumbing circuit including a pump, various valves and controls. The tanks involve a considerable amount of fabrication. Their combination with pumps and the associated plumbing also involves considerable labor, space demands, and the attendant problems of packaging into reasonably sized units, particularly where portability of the temperature controller assembly is desirable. There are also attendant maintenance problems.

In an effort to improve such systems for temperature control in manufacturing processes, an invention was made and is disclosed in a U.S. Pat. No. 5,113,931 issued May 19, 1992 and owned by Advantage Engineering, Inc. The apparatus includes a centrifugal pump which has an upwardly opening intake port with a suction tank bolted to it, and an upwardly opening discharge port with a discharge tank bolted to it. The apparatus is connected to manufacturing process equipment, an injection molding machine for example, using circulating water for temperature control. The pump moves the water from the pump through the discharge tank and the process and the suction tank back to the pump. In a "closed" circuit as in FIG. 1 of the patent, a heat sink for the cooling tank is provided by city water supply at water main pressure and delivered through cooling coils in the suction tank and out through a motor-operated modulating valve to drain. An electric heater is provided for heating water, if necessary, in the discharge tank. A sensor for the temperature of water being delivered by the system to the process, provides an appropriate signal to a controller including a microcomputer, to operate a modulator valve motor as needed to increase or decrease the amount of city water delivered through the cooling coils and out through the valve to drain. In an "open" system as shown in FIG. 6 of the patent, there are no cooling coils needed in the suction tank. In that case, the modulator valve can discharge process cooling water directly to drain. Therefore, as the temperature of the water through the process needs to be decreased, the modulator valve opens more and increases the amount of water discharged to drain. Fresh, cool, water from the city water supply or wells or other source is introduced to make up, in the process circuit, the amount of hot water that is allowed to drain out through the modulator valve.

While the apparatus covered by that patent has performed very well for its intended purpose, we consider it desirable to secure greater precision in modulating valve installation, adjustment, calibration, and improve space requirements. We also consider it desirable to provide a way to relate the flow volume of the process temperature control water to the temperature change of the water as it passes through the process, and display this information.

SUMMARY OF THE INVENTION

Described briefly, according to a typical embodiment of the present invention, a combination pump and heat exchanger assembly is provided, with the pump case serving as the mount for heat exchanger units and for the pump drive motor. The pump case has upwardly opening receptacles, one communicating with the pump intake and the other with the pump discharge. A tank unit is mounted in each of the receptacles and is removably secured therein by threaded fasteners and sealed therein by compression seals. At least one of the tank units serves a cooling function. This tank is removable and replaceable as a unit. A microprocessor-controlled, motor-operated modulating valve is mounted to this tank to discharge overheated water to drain. Fresh water make-up is provided. Temperature sensors for the water moving in the circuit as discharged to the process and for the water returning from the process are coupled to the controller. A flow meter is mounted in the tank adjacent the pump and produces a signal coupled to the controller. Inputs from this flowmeter and from the temperature sensors, to the controller, are used to calculate and display the flow rate and cooling load.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
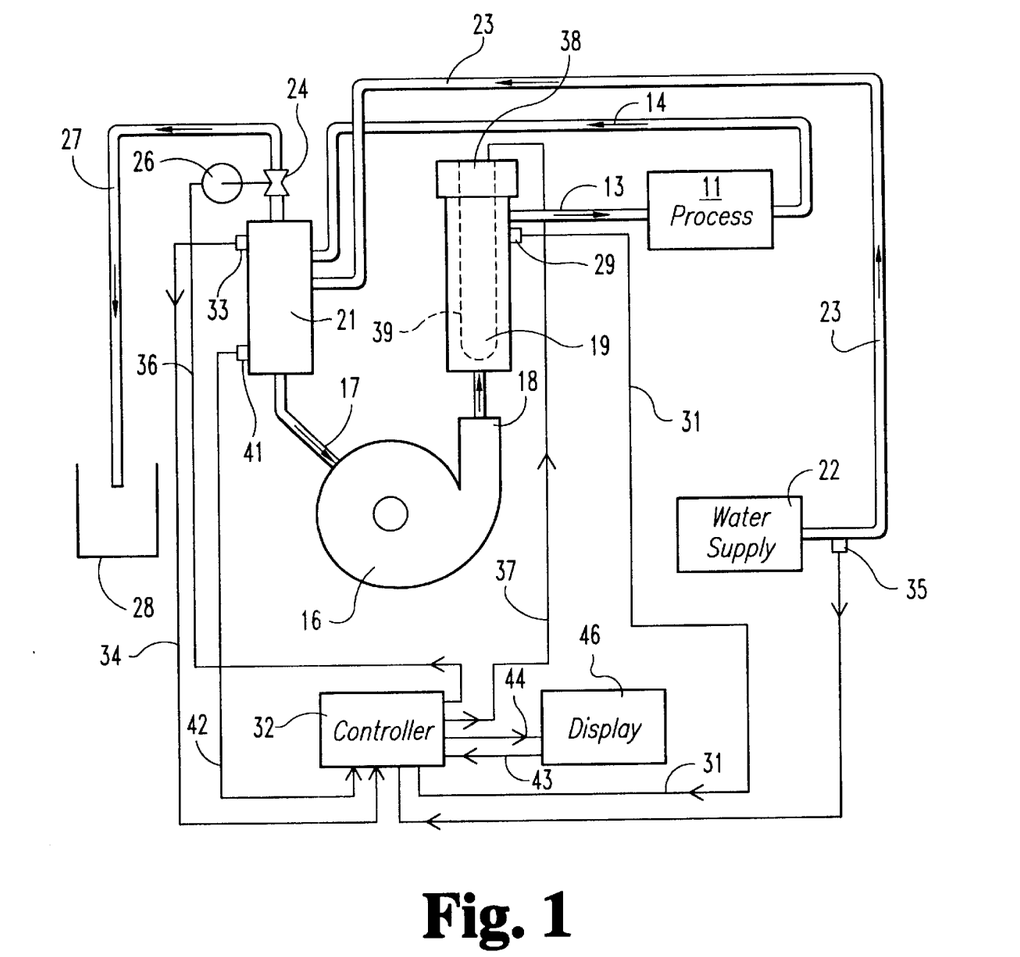
FIG. 1 is a schematic diagram of an "open circuit" process cooling water system including the pump, tank and valve assembly of the present invention therein.

Referring now to the drawings in detail, the heat transfer system includes the process equipment 11 whose temperature is to be controlled with a water line 13 delivering water to it, and a water line 14 returning water from it. A pump 16 includes a case casting including an intake passageway 17 and a discharge passageway 18. A discharge tank 19 is bolted to the pump discharge outlet and has a pipe spud opening near the top connected to the pipe 13 delivering water to the process equipment 11. A suction tank 21 is bolted to the pump intake passageway 17 and has a pipe spud near the top receiving the water returning in line 14 from the process equipment 11.

A cool water supply 22, which can be from a city water main or other pressurized water supply source, is connected through water line 23 to another pipe receiving spud on the suction tank 21 below the return water line 14. A normally closed modulator valve assembly 24 operated by motor assembly 26 is mounted to the top of the suction tank 21. There is a drain line 27 to discharge water from the modulator valve to sewer 28.

Figure 9:
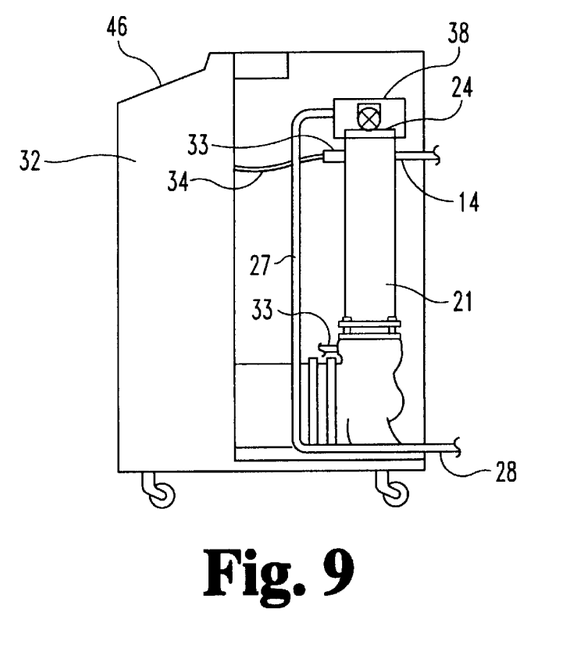
FIG. 9 is a side elevational view thereof.

A temperature sensor 29 on the discharge tank is electrically coupled through line 31 to a controller 32 for entering a signal representative of the temperature of water delivered to the process equipment 11. To simplify schematic illustration in FIG. 1, it should be understood that the controller box in FIG. 1 may include not only a microcomputer and attendant circuitry, but also relays, transformers, motor starters, overload switches and other components, some or all of which may be housed in an electrical cabinet portion of the machine such as shown in FIG. 9. A temperature sensor 33 is electrically coupled through line 34 to provide a signal to the controller 32, representing the temperature of the water from the process equipment. A water supply temperature sensor 35 on line 23 is electrically connected to the controller 32.

The controller 32 has an output on line 36 to the modulator valve motor 26. There is also an output line 37 from a heater relay in the controller to heater element terminals in the box 38 on top of discharge tank 19 to control an electrical heater 39 in the tank in case it is ever necessary to add heat to the water being delivered to the process. A magnetic sensor 41 provides a signal in line 42 to the controller 32 from a flow meter in suction tank 21. Signal lines 43 and 44 are provided between the controller 32 and a display 46.

Figure 2:
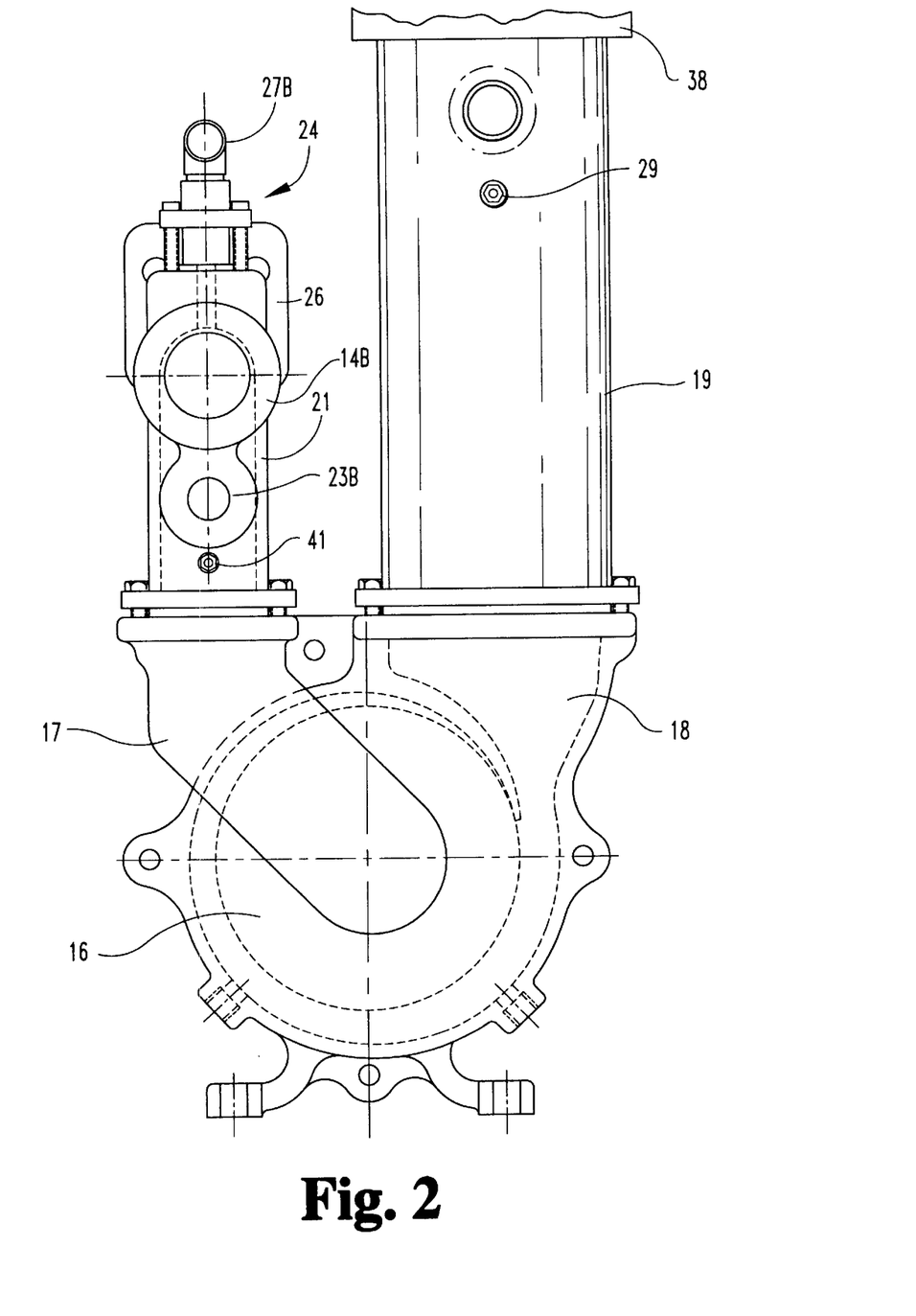
FIG. 2 is an enlarged elevational view of the pump and tank assembly.
Figure 3:
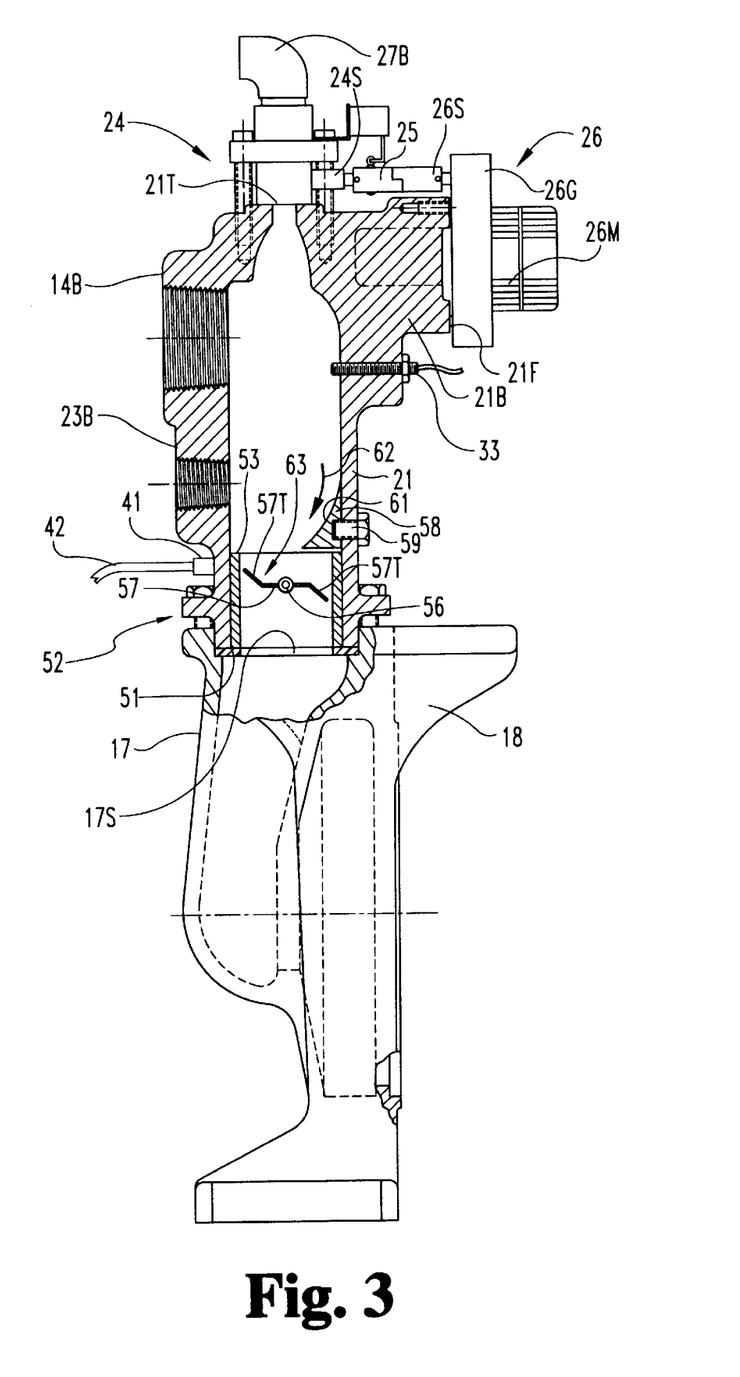
FIG. 3 is a side elevational view of the pump case as viewed from the right in FIG. 2 but omitting the pump motor and the discharge tank, and showing the suction tank in section.
Figure 4:
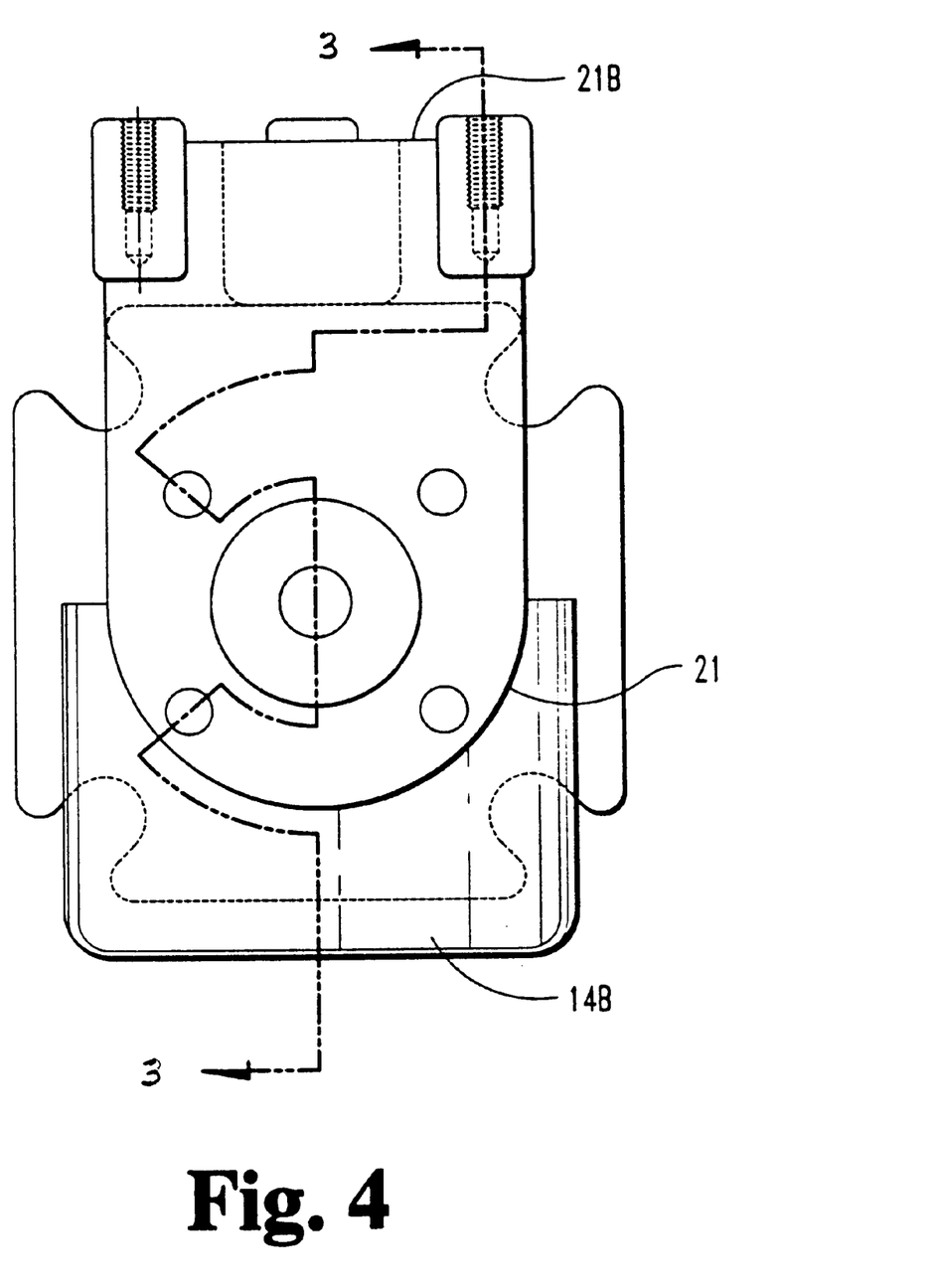
FIG. 4 is a top plan view of the suction tank without the modulator valve and drive motor for it, and including the section lines 3—3 to show where the section is cut for FIG. 3.

Referring now to FIG. 2, the pump case is very similar to that shown in the above-mentioned U.S. Pat. No. 5,113,931, and the suction tank 21 and discharge tank 19 are bolted to the pump case in essentially the same manner as described in the aforementioned patent, each of these tanks having a flange adjacent the bottom end thereof with the lower end of the tank resting on a gasket on a circumferential ledge and thereby sealed to the pump case as the bolts are tightened into the threaded openings in the tank receptacles at the suction passageway 17 and discharge passageway 18 of the pump case. The modulator valve assembly 24 is fastened to the top of the tank 21 in much the same manner. The drive motor assembly 26 is mounted to the mounting boss 21B of tank 21 by three cap screws as best shown in FIG. 3. A pipe elbow 27B at the top of the modulator valve assembly is connected to the drain line 27 of FIG. 1. The water line from the process is connected to the tapped boss 14B of the suction tank and the fresh water line 23 from the water supply source 22 is tapped into the tapped boss 23B of the suction tank. The from-process temperature sensor 33 is mounted in the suction tank diametrically opposite (FIG.1) the entry of the water through the port in boss 14B. The flow meter sensor pick-up is at 41.

Referring now to FIG. 3, where the discharge tank 19 and a portion of the pump discharge passageway 18 are broken away to enable showing details of the suction tank and flow meter, the lower end of the suction tank 21 is supported by gasket 51 resting on a shoulder at the top 17S of the pump suction passageway in the pump case. The modulator valve assembly 24 has its input shaft 24S coupled by the flexible coupling 25 to the output shaft 26S of the valve motor drive assembly 26. That assembly includes the motor 26M and gear case 26G, the latter of which is fastened to the boss 21B by three cap screws. The coupling 25 is flexible in the sense that if there happens to be any misalignment between the axes of the shaft 24S and shaft 26S, it can be compensated for by the flexibility of the coupling 25. But there is virtually no flexibility in a rotational sense. Therefore, the rotational index between the drive motor shaft 26S and the pump shaft 24S is maintained essentially constant at all times. Because the suction tank 21 is a single casting, the face 21T at the top to which the modulator valve is mounted, and the faces of the three bolt bosses 21F to which the drive motor assembly 26 is mounted, are flat and can be machined precisely in a plane at right angles to the plane of the face 21T, the relationship of the valve drive shaft 24S and motor output shaft 26S can be precisely and reliably established at the outset for precision control of the valve in response to signals to the motor from the controller 32. An example of the valve is a three-piece ball valve model B6800 by Watts Regulator Company of Andover, MA. An example of the valve drive motor is Part No.UBF1NO1F50CNNN by Burgess SAIA, Inc of Buffalo Grove, Ill. The flexible coupling is No. TC 10-3290.3118AN-1 by Impulse Mechanisms Inc.

Figure 5:
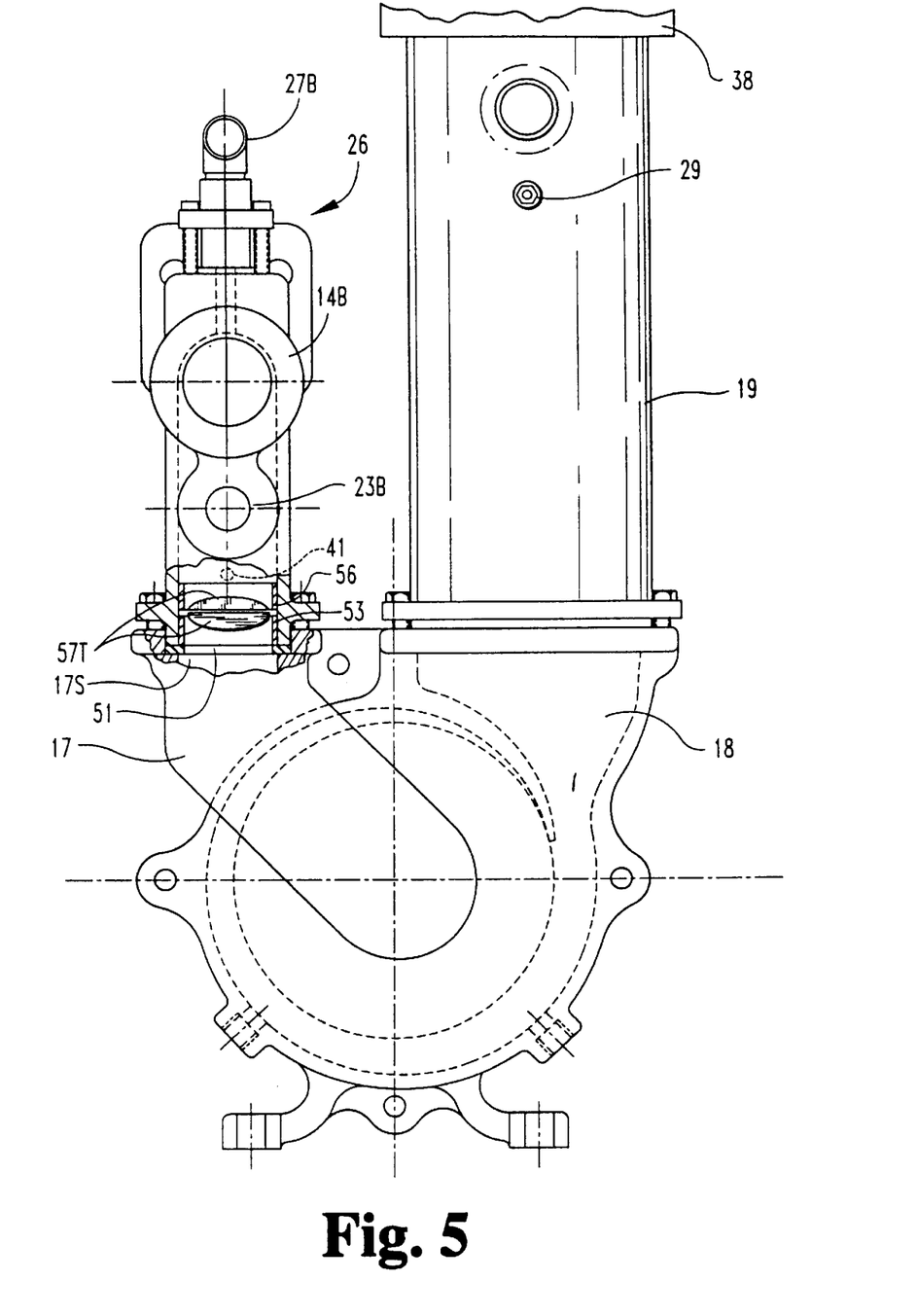
FIG. 5 is an elevational view similar to FIG. 1 but with a part of the suction tank and the pump case broken away to show features of the flowmeter.

In addition to the mountings of the modulator valve and its drive motor so as to be integral with the cast suction tank 21, another feature of the invention is the provision of the flow meter assembly 52. In the embodiment of FIGS. 2, 3 and 5, this includes a cylindrical sleeve 53 slidably received in the bore of tank 21 and supported by gasket 51. There is a shaft 56 mounted in sleeve 53 for rotation therein and to which is secured a vane 57 with tip portions angled away from the plane of the vane as at 57T. The vane is fixed to the shaft 56 and the shaft is freely rotatable in sleeve 53. A guide fillet 58 is secured in the tank wall by a bolt 59 and has a curved flow-director surface 61 to direct the downward flow from the suction tank input ports in bosses 23B and 14B in the direction of arrow 62 to cause the vane 57 to rotate in the counterclockwise direction indicated by arrow 63. A magnetic pick-up assembly 41 extends into the tank wall to sense the passage of the vane tips to provide a signal to the controller 32.

FIG. 5, which is a view similar to FIG. 2, is cut away to show the flow meter assembly at 90° from the showing in FIG. 3. The location of the magnetic pick-up 41 is shown by dotted lines because, in FIG. 3 it is shown on the same face as the pipe receiver bosses 14B and 23B, but that portion of the housing is broken away in FIG. 5 to show interior detail.

Figure 6:
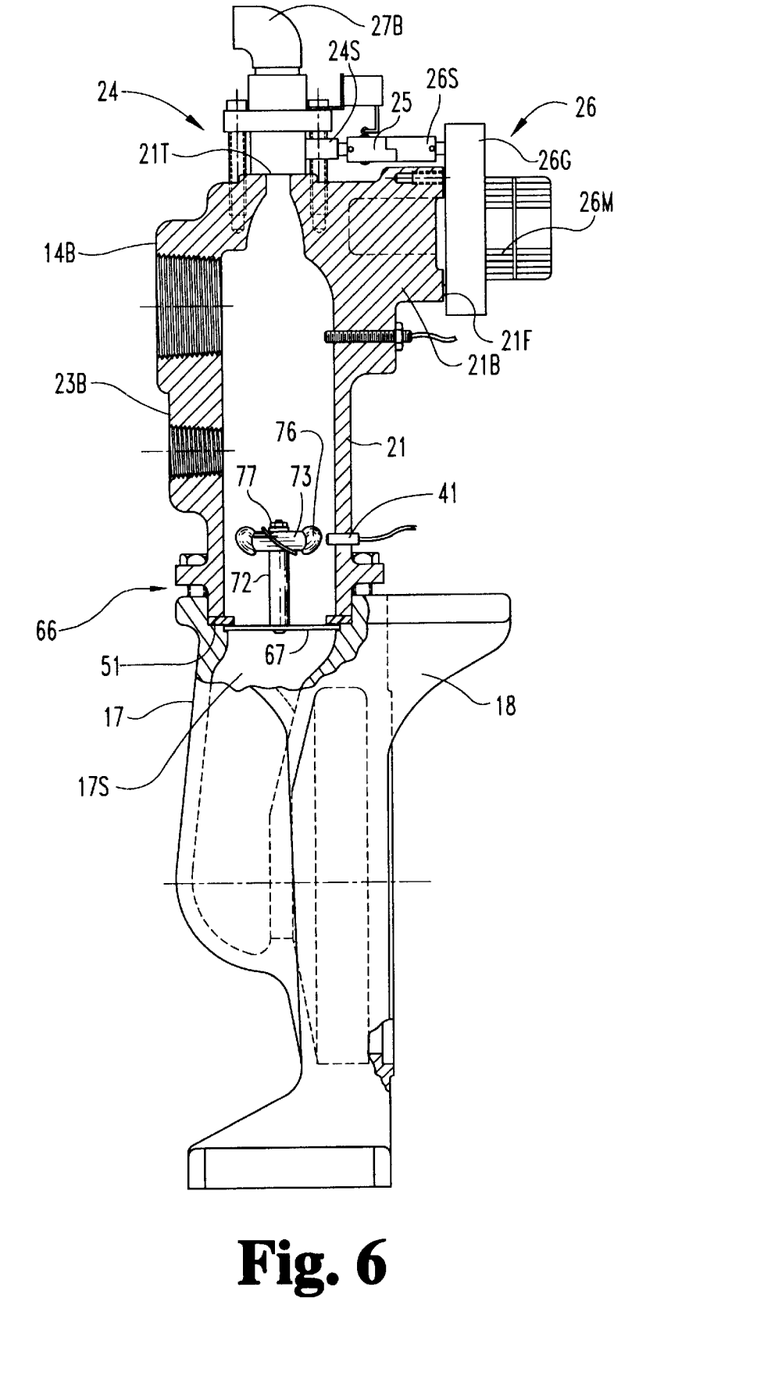
FIG. 6 is a side elevational view of the pump case similar to FIG. 2 but showing a preferred embodiment of the flowmeter apparatus in the suction tank.
Figure 7:
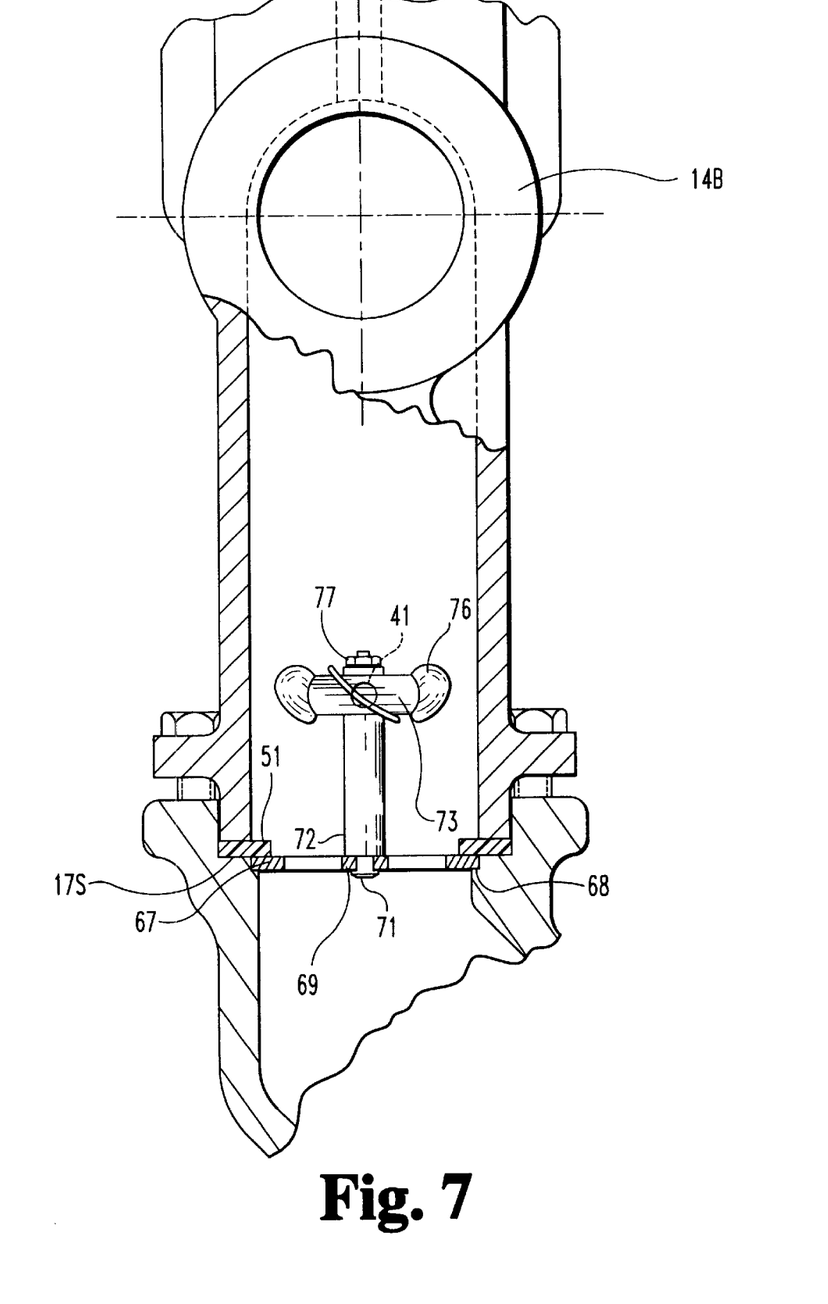
FIG. 7 is an enlarged fragmentary portion of an elevational view similar to FIG. 5 but showing the flowmeter apparatus of FIG.6. enlarged to show mounting details.

Referring now to FIGS. 6 and 7, instead of the sleeve 53 of FIGS. 3 and 5 providing the support for the flow meter shaft 56, the flow meter apparatus 66 of FIGS. 6 and 7 has a support ring 67 received on a shoulder 68 in the pump case immediately below shoulder 17S. The gasket ring 51 seals against shoulder 17S just as in the previously described embodiment. It also holds the support ring 67 down against the shoulder 68. A spoke 69 extends diametrically across the center of the ring 67 and, at the center of the spoke, a shaft 71 is secured to the spoke. A bearing is provided at 72 and supports a hub 73 to which a set of vanes is mounted. The hub, with vanes, rotates freely on shaft 71. In the illustrated example, the vane wheel has four vanes 76, three of which are shown in the drawing. A nut 77 at the top of the shaft retains the vane wheel on the shaft. Xolox Corporation of Fort Wayne, Ind. is a source.

A magnetic pick-up sensor 41 is provided as in the previously described embodiment and is responsive to the passage thereof by the vanes, which may be made of a molded nylon impregnated with ferromagnetic material and polarized appropriately to cooperate with the sensor 41 screwed into the wall of the tank. With the tank lower end forced tightly against the gasket 51 by the tank mounting bolts, the gasket provides the needed seal between the pump case and the tank and, at the same time, secures the ring 67 onto the shoulder 68 to provide a secure mounting for the rotatable vane.

Figure 8:
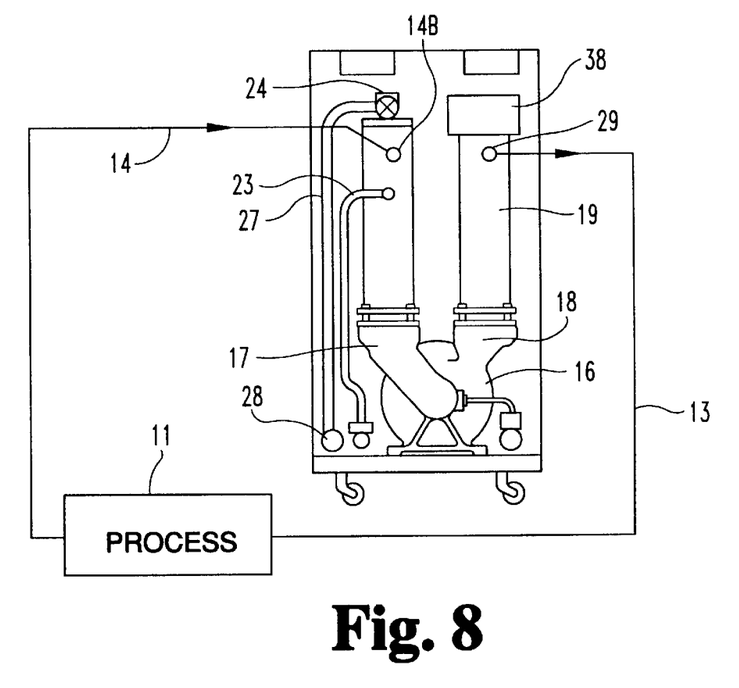
FIG. 8 is a rear end elevational view of a complete machine employing the pump and heat exchanger assembly of the present invention in an "open circuit" process water system.

FIGS. 8 and 9 show the apparatus in a wheel mounted machine to facilitate moving it to and around the process equipment to which it is to be connected. The electrical cabinet is given the reference numeral 32 for consistency with the description of the schematic FIG. 1.

Figure 10:
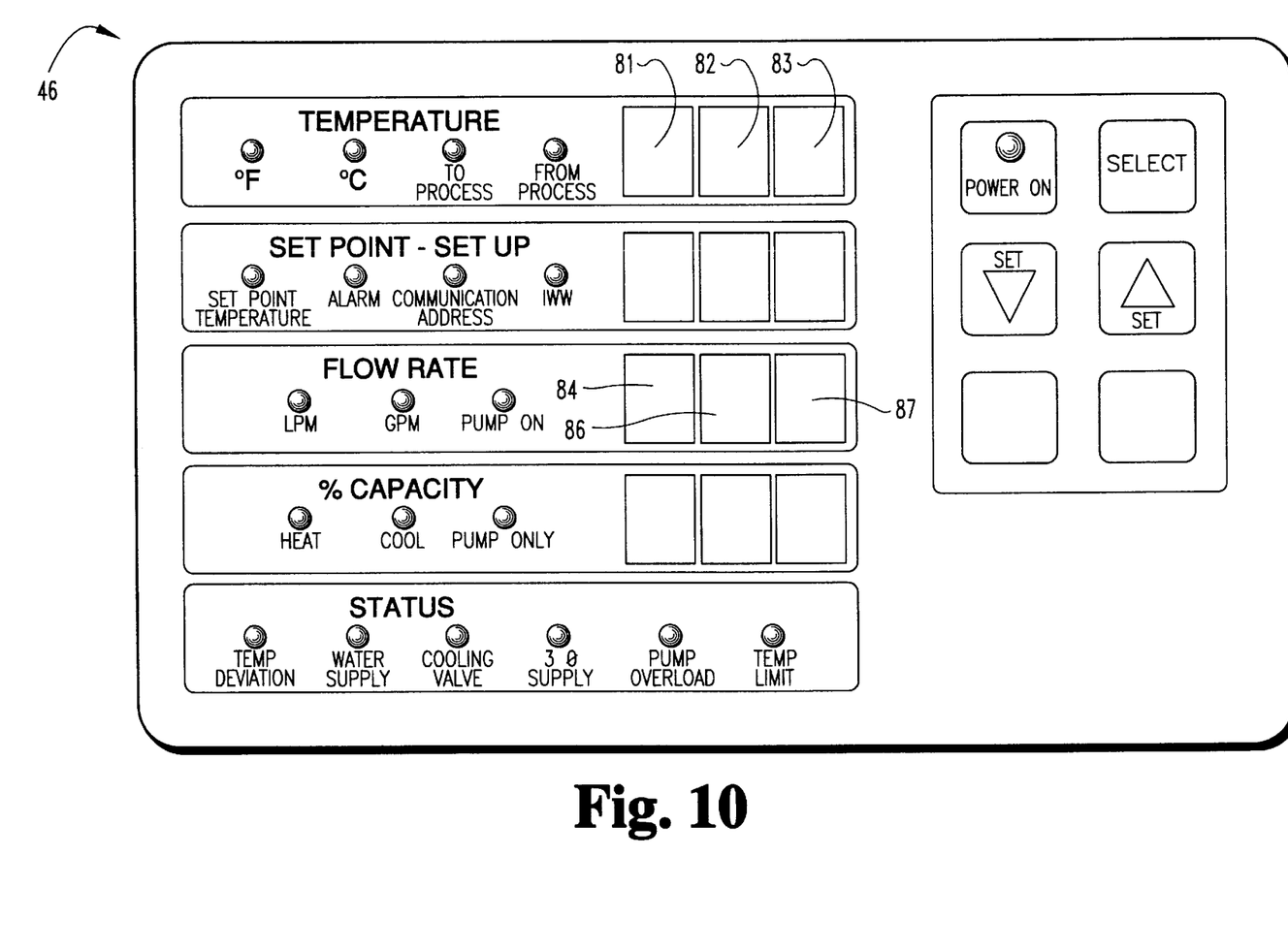
FIG. 10 is a schematic diagram of an information display.

FIG. 10 is an example of the control panel display. In the first row, the pertinent legends adjacent the temperature indicating lights, are situated to the left of the LED numerical display windows 81, 82, and 83 which show, upon selection of the parameter of interest, the water temperature to the process or from the process. In the third row, the LED windows 84, 86 and 87 will display the flow in gallons per minute or litres per minute, as detected by the flowmeter. Pressure gauges and other features are provided on the machine as described in the above-mentioned patent and as are available from the assignee of the present invention in its Sentra series temperature controllers.

It was mentioned that the prior patent discloses both an open system and a closed system. In the present case, the present invention has been described as applied in an open system where the process equipment temperature control water can be discharged to drain if the temperature rises above the desired level. The invention can also be applied to a closed system. In that case, the flow meter and to-process temperature sensor can be located and used in the same way as described above. But preferably the water from the process would be passed through a separate heat exchanger as in the closed circuit temperature controller machine currently marketed by the assignee of this application, and then returned to the suction tank of the machine. The from-process temperature sensor, and the modulator valve assembly would be located in the same manner as that machine, to control discharge of the heat exchanger cooling water in the external circuit from the heat exchanger to drain.

In addition to the foregoing possible modifications, it shouldibe understood that the present invention could be incorporated with a refrigerated fluid chiller providing the heat sink for the closed system. In that case, the modulator valve can be used in the chiller in a closed circuit for water or other heat exchanger fluid used in a heat exchanger coil or other device associated with the suction tank of the present invention. The computation necessary to calibrate the flow meter for the appropriate displays of information, and for calculation of cooling loads and chiller tonnage, are within the skill of the art, and not needed here. Other applications of the flowmeter and/or modulator valve and mounting of the present invention may be used with chiller machines or other apparatus and are intended to be covered. Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be protected.

What is claimed is:

1. A heat transfer system for temperature control in a manufacturing process and comprising:
   a pump with a case having a pump intake passageway and a pump discharge passageway;
   a first tank receiver on the case and communicating with one of the passageways;
   a first tank received in the first receiver and having an inlet port for coolant from the process;
   a releasable fastener removably securing the first tank to the case;
   a tank discharge port in the first tank at a location remote from the first receiver;
   a second tank receiver on the case and communicating with the other of the passageways;
   a second tank received in the second receiver and having a heater inside the tank;
   a releasable fastener removably securing the second tank to the case;
   a second tank discharge port in the second tank at a location remote from the receiver;
   the second tank receiver communicating with the pump discharge passageway and the first tank receiver communicating with the pump intake passageway, the combination further comprising:
   a modulator valve having an inlet at the first tank discharge port and having an outlet to drain;
   a temperature sensor for fluid passing through the second tank to the discharge port for delivery to the process;
   a temperature sensor for fluid passing from the process into the first tank; a controller coupled to one of the temperature sensors and to the modulator valve and operable in response to increasing temperature in one of the tanks to operate the valve to increase flow from the outlet to drain;
   a process using circulating water for process equipment temperature control and having an inlet and an outlet;
   the second tank having a discharge port coupled to the process inlet for delivering water from the pump discharge passageway to the process inlet;
   the first tank having an inlet port coupled to the process outlet for receiving water from the process and delivering received water through the first tank to the pump intake passageway: and
   flowmeter apparatus adjacent the first tank receiver and responsive to the flow into the pump case.

2. The system of claim 1 and further comprising:
   a display coupled to the controller and responsive to the controller to display the flow rate and load calculated by the controller based on inputs to the controller from the temperature sensors and from the flowmeter apparatus.

3. The system of claim 1 and wherein:
   the flowmeter apparatus includes:
   a support fixed relative to the first tank;
   a vane rotatably mounted to the support; and
   a pickup device adjacent the vane and responsive to rotation of the vane to send a signal to the controller.

4. The system of claim 3 and wherein:
   the support is secured in position between the first tank and a portion of the pump case;

a shaft projects from the support; and the vane is rotatably mounted on the shaft.

5. The system of claim 4 and wherein:

the first tank receiver has first and second shoulders therein;

a seal ring is received on the first shoulder;

the support is received on the second shoulder; and the first tank has an end sealingly engaging the seal ring and forcing the seal ring into sealing engagement with the case and forcing the seal ring into engagement with the support and thereby securing the support on the second shoulder.

6. The system of claim 5 and wherein:

at least one additional vane is rotatably mounted to the shaft; and the vanes are located in the first tank.

7. The system of claim 3 and wherein:

the support is a sleeve received in the first tank; and a flow guide is mounted in the first tank upstream of the vane and oriented to direct flow to the vane in a direction to cause the vane to rotate consistently in one rotational direction in response to flow through the tank into the pump case intake passageway from the second tank.

8. In a heat transfer system for temperature control in a manufacturing process, the combination comprising:

a pump with a case having a pump intake passageway and a pump discharge passageway;

a first tank receiver on the case and communicating with one of the passageways;

flowmeter apparatus adjacent the first tank reciever and responsive to the flow into the pump case;

a first tank received in the first receiver and having an inlet port for coolant from the process;

a releasable fastener removably securing the first tank to the case;

a tank discharge port in the first tank at a location remote from the first receiver;

a second tank receiver on the case and communicating with the other of the passageways;

a second tank received in the second receiver and having a heater inside the tank;

a releasable fastener removably securing the second tank to the case;

a second tank discharge port in the second tank at a location remote from the receiver;

the second tank receiver communicating with the pump discharge passageway and the first tank receiver communicating with the pump intake passageway, the combination further comprising:

a modulator valve having an inlet at the first tank discharge port and having an outlet to drain;

a temperature sensor for fluid passing through the second tank to the discharge port for delivery to the process;

a temperature sensor for fluid passing from the process into the first tank;

a controller coupled to one of the temperature sensors and to the modulator valve and operable in response to increasing temperature in one of the tanks to operate the valve to increase flow from the outlet to drain;

wheels supporting the combination of the pump, the temperature sensor and the controller for mobility thereof relative to the process; and a display supported by the wheels and coupled to the controller for displaying the amount of water flow detected by said flowmeter apparatus and the temperature of the flowing water.

9. The combination comprising:

a first tank having first and second ends;

a first port in the first tank and remote from the first end of the first tank and having a first mounting surface around the port and lying in a first plane;

a second mounting surface on the first tank lying in a second plane perpendicular to the plane of the first surface;

a modulator valve mounted to the first mounting surface and having an inlet at the first port and having an outlet to drain;

a modulator valve drive motor mounted on the second mounting surface and driving the valve;

a pump having a case, the first end of the first tank being fastened to the case and the case having an intake passageway;

a flowmeter received in the first end of the first tank and including a vane rotatably mounted in the first tank;

a sensor device in a portion of the tank adjacent the vane and responsive to changing distance of a portion of the vane relative to a portion of the device to produce a signal;

a first tank receiver on the case and communicating with the intake passageway;

the first tank having its first end received in the first tank receiver and having an inlet port for coolant delivery from the process;

a releasable fastener removably securing the tank to the case;

a second tank receiver on the case and communicating with a discharge passageway of the case;

a second tank received in the second tank receiver and having an outlet port for coolant delivery to the process;

a releasable fastener removably securing the second tank to the case;

a temperature sensor for fluid passing through the second tank to the outlet port for delivery to the process;

a temperature sensor for fluid passing from the process into the first tank; and a controller coupled to one of the temperature sensors and to the modulator valve and operable in response to increasing temperature in the first tank to operate the valve to increase flow from the modulator valve outlet to drain.

* * * * *